(12) United States Patent
Sakuma

(10) Patent No.: US 11,196,890 B2
(45) Date of Patent: Dec. 7, 2021

(54) IMAGE READING APPARATUS

(71) Applicant: CANON KABUSHIKI KAISHA, Tokyo (JP)

(72) Inventor: Tomofumi Sakuma, Tsukuba (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/838,480

(22) Filed: Apr. 2, 2020

(65) Prior Publication Data
US 2020/0329172 A1 Oct. 15, 2020

(30) Foreign Application Priority Data

Apr. 9, 2019 (JP) .............................. JP2019-074197

(51) Int. Cl.
H04N 1/00 (2006.01)
H04N 1/10 (2006.01)
H04N 1/107 (2006.01)
G06F 3/12 (2006.01)

(52) U.S. Cl.
CPC ......... *H04N 1/1017* (2013.01); *H04N 1/1039* (2013.01); *H04N 1/1072* (2013.01); *H04N 2201/0428* (2013.01)

(58) Field of Classification Search
CPC .. H04N 1/1013; H04N 1/1017; H04N 1/1039; H04N 1/1072; H04N 1/00533; H04N 1/00549; H04N 1/00516; H04N 2201/02491; H04N 2201/0428
USPC ................................................. 358/474, 497
See application file for complete search history.

(56) References Cited

U.S. PATENT DOCUMENTS

| 10,477,051 | B2 | 11/2019 | Sakuma | H04N 1/00801 |
| 2010/0328736 | A1* | 12/2010 | Ozawa | H04N 1/1017 358/494 |
| 2014/0063571 | A1* | 3/2014 | Sayama | H04N 1/1026 358/497 |
| 2014/0240802 | A1* | 8/2014 | Otomo | H04N 1/1026 358/497 |
| 2018/0103168 | A1 | 4/2018 | Sakuma | H04N 1/00801 |
| 2018/0364636 | A1* | 12/2018 | Imai | G03G 15/04036 |
| 2019/0260892 | A1* | 8/2019 | Kawai | G03G 15/221 |

FOREIGN PATENT DOCUMENTS

JP 2018-152844 9/2018

* cited by examiner

*Primary Examiner* — Chad Dickerson
(74) *Attorney, Agent, or Firm* — Venable LLP

(57) ABSTRACT

An image reading apparatus including: a reading unit configured to read an image of an original in a main scanning direction; a housing configured to accommodate the reading unit; a guide member configured to guide a movement of the reading unit in a sub-scanning direction orthogonal to the main scanning direction; and a restricting member configured to restrict the movement of the reading unit in the sub-scanning direction and a movement of the reading unit in a vertical direction orthogonal to the main scanning direction and the sub-scanning direction.

11 Claims, 5 Drawing Sheets

IMAGE READING APPARATUS

BACKGROUND OF THE INVENTION

Field of the Invention

The present invention relates to an image reading apparatus configured to read an image of an original.

Description of the Related Art

Hitherto, there has been known an image reading apparatus including a platen glass on which an original is placed, a reading unit configured to read an image of the original placed on the platen glass, and a housing in which the reading unit is accommodated. However, in logistics of delivering an image reading apparatus from a manufacturer to a consumer, the reading unit may be moved in the housing to cause breakage. In view of this, Japanese Patent Application Laid-Open No. 2018-152844 proposes that a restricting member configured to restrict a movement of the reading unit in the logistics is mounted to the housing. The restricting member disclosed in Japanese Patent Application Laid-Open No. 2018-152844 is caused to slide in a main scanning direction to engage to an engagement portion of the reading unit, thereby restricting the movement of the reading unit.

However, the restricting member disclosed in Japanese Patent Application Laid-Open No. 2018-152844 is mounted to only one end of the reading unit in a scanning direction (hereinafter referred to as "sub-scanning direction"). Consequently, during the logistics of the image reading apparatus, another end of the reading unit in the sub-scanning direction is caused to be uplifted, and hence the movement of the reading unit in a vertical direction and the sub-scanning direction cannot be restricted sufficiently. As a result, there is a fear in that the movement of the reading unit with respect to the housing in the logistics may lead to the breakage of the reading unit.

SUMMARY OF THE INVENTION

In order to solve the above-mentioned problem, according to an embodiment of the present invention, there is provided an image reading apparatus comprising: a reading unit configured to read an image of an original in a main scanning direction; a housing configured to accommodate the reading unit; a guide member configured to guide a movement of the reading unit in a sub-scanning direction orthogonal to the main scanning direction; and a restricting member configured to restrict the movement of the reading unit in the sub-scanning direction and a movement of the reading unit in a vertical direction orthogonal to the main scanning direction and the sub-scanning direction.

Further features of the present invention will become apparent from the following description of exemplary embodiments with reference to the attached drawings.

DESCRIPTION OF THE EMBODIMENTS (Image Reading Apparatus)

Figure 1:
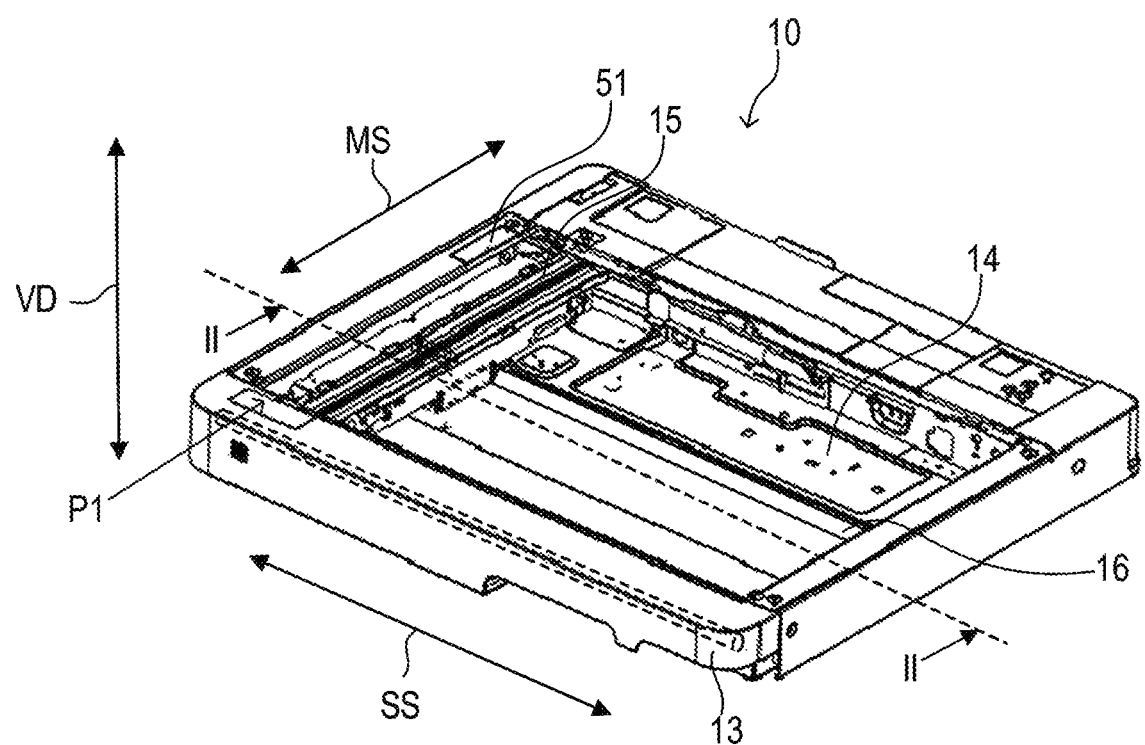
FIG. 1 is a perspective view of an image reading apparatus.
Figure 2:
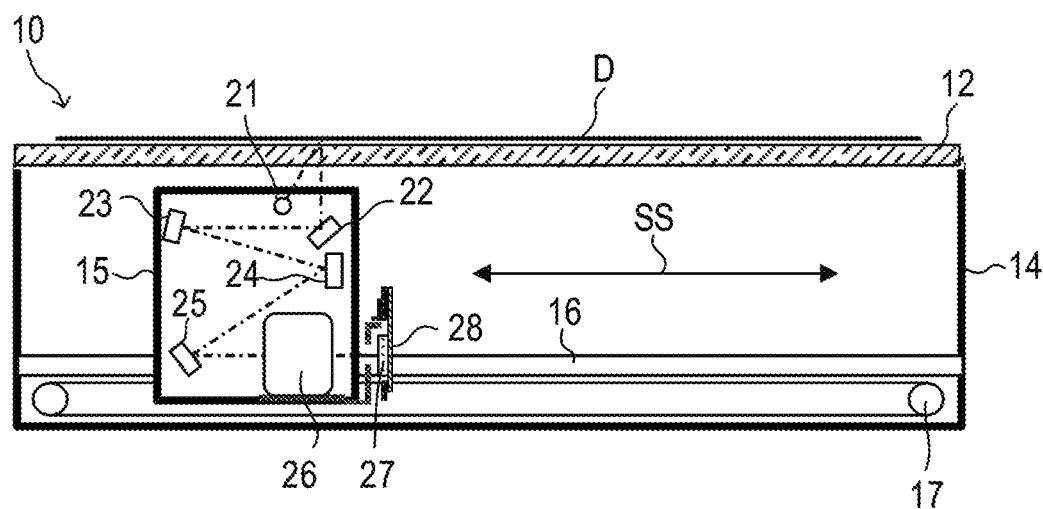
FIG. 2 is a sectional view of the image reading apparatus taken along the line II-II of FIG. 1.

Now, an image reading apparatus 10 according to this embodiment is described. FIG. 1 is a perspective view of the image reading apparatus 10. FIG. 2 is a sectional view of the image reading apparatus 10 taken along the line II-II of FIG. 1. As illustrated in FIG. 2, the image reading apparatus 10 includes a housing 14 configured to accommodate a reading unit 15. On an upper surface of the housing 14, there is provided a platen glass 12 on which an original D is placed. Below the platen glass 12, the reading unit 15 is arranged inside the housing 14. The reading unit 15 includes optical components such as a light source 21, mirrors 22, 23, 24, and 25, and a lens 26. The light source 21 is configured to radiate light onto the original D. The mirrors 22, 23, 24, and 25 are configured to reflect the reflected light from the original D. The lens 26 is configured to image the reflected light onto an image sensor 27. The image sensor 27 is configured to read an image of the original D in a line in a main scanning direction MS. The reading unit 15 is movable in a sub-scanning direction (scanning direction) SS orthogonal to the main scanning direction MS by being guided by a guide member 13 and a guide member 16. The guide member 13 is provided at one end of the housing 14 in the main scanning direction MS. The guide member 16 is provided at substantially the center of the housing 14 in the main scanning direction MS. The reading unit 15 is moved in the sub-scanning direction SS by a drive mechanism (motor) 17. The guide member 13 and the guide member 16 are each a shaft. The shaft may be a columnar member or a bar-like member having a polygonal cross section.

When the image reading apparatus 10 receives a reading start signal from a user, the image reading apparatus 10 causes the light source 21 to emit light, and reads the image of the original D placed on the platen glass 12 while moving the reading unit 15 in the sub-scanning direction SS by the drive mechanism 17. A printed circuit board 28 to which the image sensor 27 is mounted is provided to the reading unit 15. One end of a flexible flat cable (hereinafter referred to as "FFC") (not shown) is connected to the printed circuit board 28. The FFC (not shown) is arranged so as to slide on a rear side plate of a frame body of the image reading apparatus 10. The FFC (not shown) extends from an opening (not shown) of the rear side plate of the frame body toward the outside of the image reading apparatus 10. Another end of the FFC (not shown) is connected to a controller circuit board (not shown). The image of the original D read by the reading unit 15 is transmitted as image information (image signal) to the controller circuit board (not shown) by the FFC (not shown). The controller circuit board (not shown) is configured to file the image information, or transmit the image information to an image forming unit (not shown) so as to form an image on a recording medium based on the image information.

Figure 3:
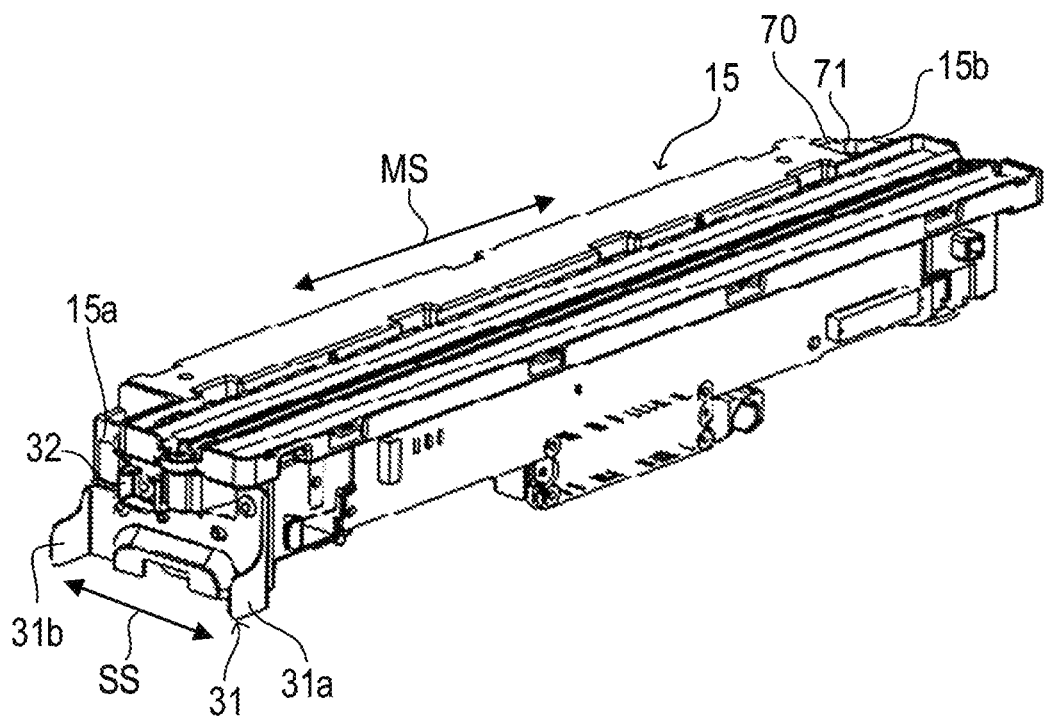
FIG. 3 is a perspective view of a reading unit.

In logistics in which the image reading apparatus 10 is conveyed, the reading unit 15 is moved with respect to the housing 14 due to dropping off of the image reading apparatus 10 or vibration transmitted to the image reading apparatus 10 in some cases. The movement of the reading unit 15 with respect to the housing 14 in the logistics may lead to breakage of the reading unit 15. Therefore, in order to restrict the movement of the reading unit 15 with respect to the housing 14 in the logistics, a restricting member 31 is provided to the reading unit 15. FIG. 3 is a perspective view of the reading unit 15. In this embodiment, as illustrated in FIG. 3, the restricting member 31 is arranged on one end 15a of the reading unit 15 in the main scanning direction MS. The restricting member 31 extends in the sub-scanning direction SS. Extending portions (hereinafter referred to as "protruding portions") 31a and 31b extending in the main scanning direction MS are provided to both ends of the restricting member 31 in the sub-scanning direction SS, respectively. A sliding member 32 configured to slide on the guide member 13 is fixed to the one end 15a of the reading unit 15 in the main scanning direction MS. That is, the guide member 13 is provided between the sliding member 32 and the protruding portions 31a and 31b in a vertical direction orthogonal to the main scanning direction MS and the sub-scanning direction SS.

Figure 4A:
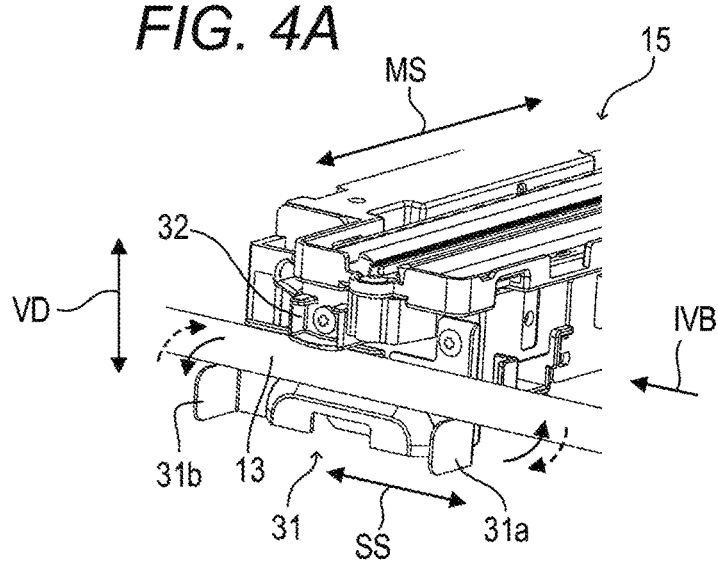
FIG. 4A, FIG. 4B and FIG. 4C are enlarged views of a restricting member.
Figure 4B:
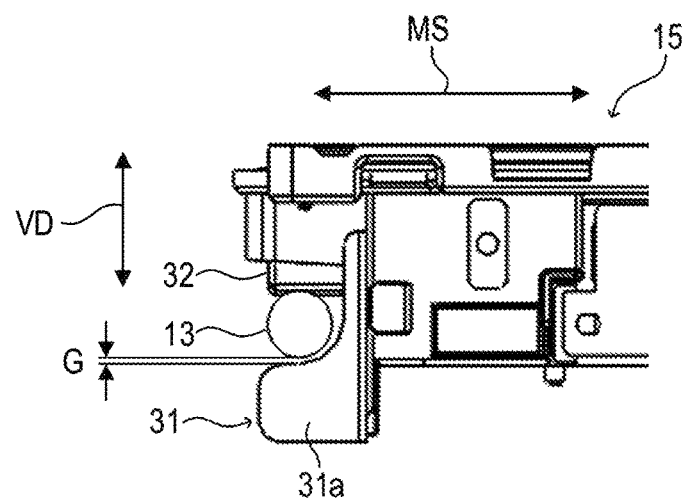
Figure 4C:
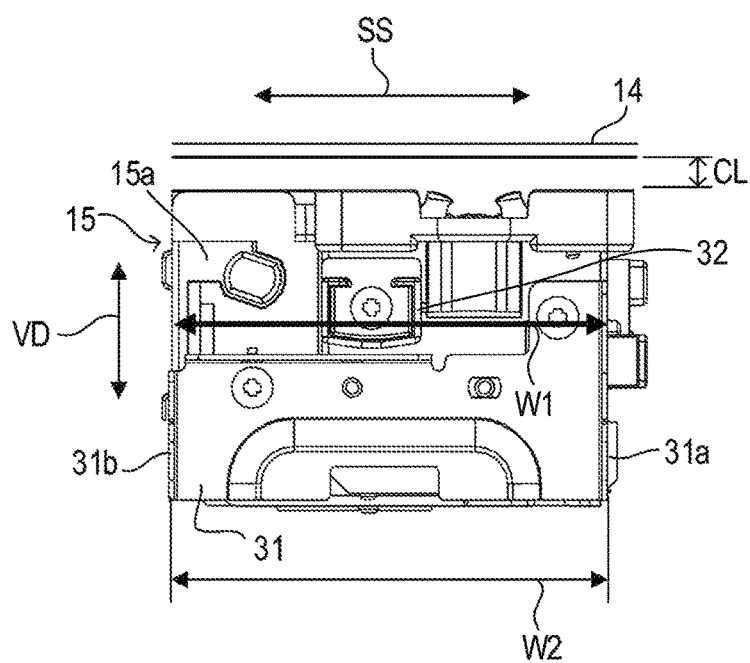

FIG. 4A, FIG. 4B, and FIG. 4C are enlarged views of the restricting member 31. FIG. 4A is a perspective view of the restricting member 31 mounted to the one end 15a of the reading unit 15. FIG. 4B is a view of the restricting member 31 as viewed along a direction indicated by the arrow IVB of FIG. 4A. As illustrated in FIG. 4B, the protruding portion 31a (31b) of the restricting member 31 has a region overlapping with the guide member 13 as viewed along a vertical direction VD orthogonal to the main scanning direction MS and the sub-scanning direction SS. The protruding portions 31a and 31b of the restricting member 31 are arranged on a side opposite to the sliding member 32 with respect to the guide member 13. In this embodiment, the protruding portions 31a and 31b of the restricting member 31 are arranged below the guide member 13 in the vertical direction VD. The sliding member 32 is held in contact with the guide member 13. The restricting member 31 is arranged in the vicinity of the sliding member 32. Thus, a gap G between the guide member 13 and the protruding portions 31a and 31b of the restricting member 31 can be reduced in the vertical direction VD orthogonal to the main scanning direction MS and the sub-scanning direction SS. The movement of the reading unit 15 in the vertical direction VD can be restricted by the sliding member 32, the restricting member 31, and the guide member 13.

FIG. 4C is a view of the restricting member 31 mounted to the one end 15a of the reading unit 15 as viewed along the main scanning direction MS. Further, in this embodiment, as illustrated in FIG. 4C, the restricting member 31 is formed so that a width W2 of the restricting member 31 is equal to a width W1 of the reading unit 15. For example, even when an external force in a direction indicated by the solid arrows or the dotted arrows of FIG. 4A acts on the reading unit 15, uplift of the reading unit 15 is restricted by the restricting member 31 having the width W2 equal to the width W1 of the reading unit 15. In this embodiment, it is most suitable that the width W2 of the restricting member 31 be set equal to the width W1 of the reading unit 15. However, the width W2 of the restricting member 31 may be larger than the width W1 of the reading unit 15 or smaller than the width W1 of the reading unit 15.

Further, in this embodiment, the reading unit 15 and the restricting member 31 are formed as separate members. The restricting member 31 is made of a material different from that of the reading unit 15. However, the restricting member 31 may be formed integrally with the reading unit 15. For example, protruding portions protruding from the reading unit 15 in the main scanning direction MS may be formed integrally on both ends of the reading unit 15 in the sub-scanning direction SS, respectively. The restricting member 31 may be made of the same material as the reading unit 15.

Figure 5A:
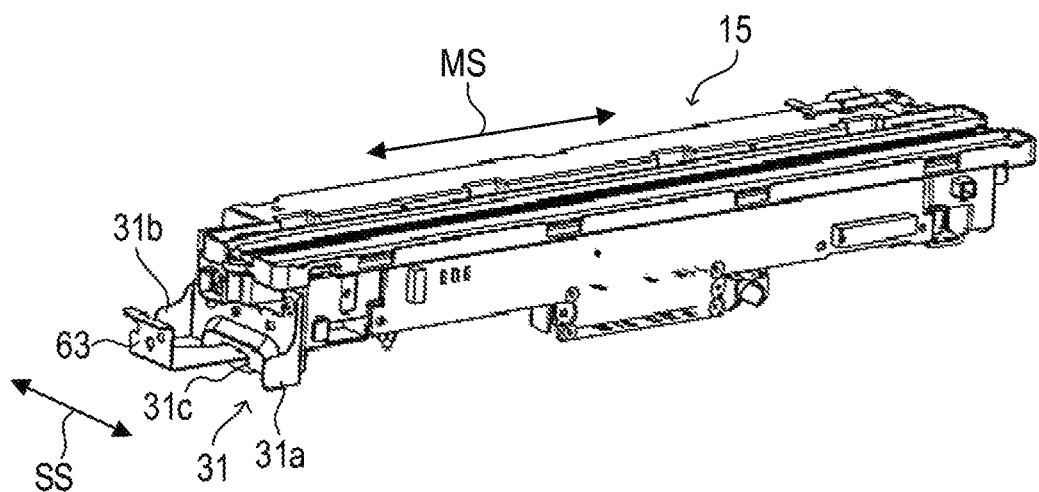
FIG. 5A, FIG. 5B and FIG. 5C are views for illustrating a fixing member.
Figure 5B:
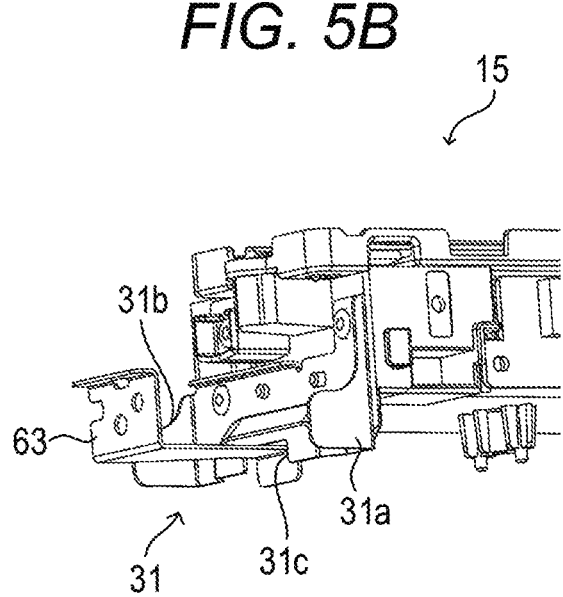
Figure 5C:
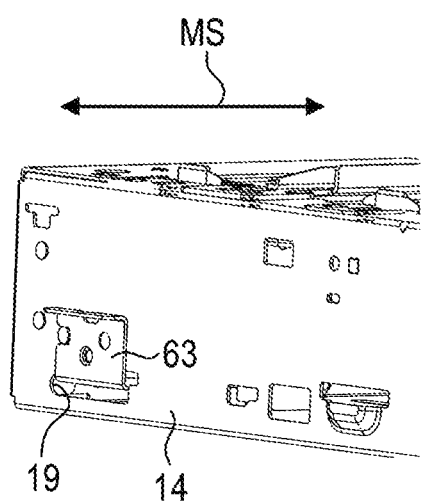

Depending on a situation of a packing form or a conveyance path of the image reading apparatus 10, an impact of dropping off of the image reading apparatus 10 or vibration transmitted to the image reading apparatus 10 may become larger in the logistics. Therefore, a fixing member 63 is inserted into the restricting member 31 to restrict the movement of the reading unit 15 in the sub-scanning direction SS. FIG. 5A, FIG. 5B, and FIG. 5C are views for illustrating the fixing member 63. As illustrated in FIG. 5A to FIG. 5C, the fixing member 63 is inserted into the restricting member 31 in the main scanning direction MS through a hole 19 formed in the housing 14. The fixing member 63 is engaged to the hole 19 formed in the housing 14, and the movement of the fixing member 63 in the sub-scanning direction SS with respect to the housing 14 is restricted by the hole 19. As illustrated in FIG. 5B, the restricting member 31 has a hole (opening) 31c having a U shape (groove shape). A distal end of the fixing member 63 is inserted into the hole 31c having a U shape of the restricting member 31. The fixing member 63 is fixed to the housing 14 with a screw (not shown). The distal end of the fixing member 63 fixed to the housing 14 is engaged to the hole 31c of the restricting member 31 fixed to the reading unit 15 to restrict the movement of the reading unit 15 in the sub-scanning direction SS.

A width of the fixing member 63 in the sub-scanning direction SS and a width of the hole 31c of the restricting member 31 in the sub-scanning direction SS are set so that the movement of the reading unit 15 in the sub-scanning direction SS falls within an allowable range. In this embodiment, the hole 31c of the restricting member 31 is formed into a U shape. However, the hole 31c of the restricting member 31 is not limited to the U shape, but may have a square shape. The distal end of the fixing member 63 is inserted into the hole having a square shape of the restricting member 31 to restrict the movement of the reading unit 15 in the vertical direction VD and the sub-scanning direction SS. As described above, the restricting member 31 of this embodiment is provided to the one end 15a of the reading unit 15 in the main scanning direction MS, and restricts the movement of the reading unit 15 in the vertical direction VD and the movement of the reading unit 15 in the sub-scanning direction SS.

Figure 6A:
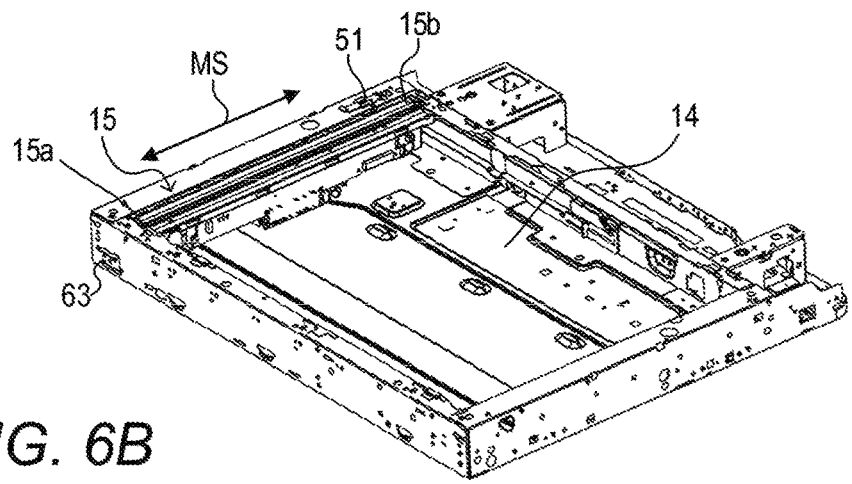
FIG. 6A, FIG. 6B, FIG. 6C, FIG. 6D and FIG. 6E are views for illustrating a second restricting member.
Figure 6B:
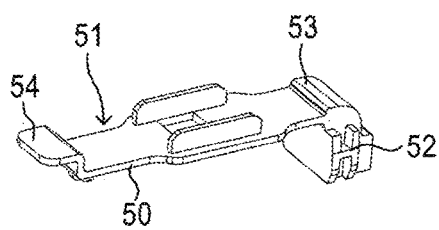

A second restricting member 51 may be mounted to the image reading apparatus 10 in addition to the restricting member 31 serving as a first restricting member. FIG. 6A, FIG. 6B, FIG. 6C, FIG. 6D, and FIG. 6E are views for illustrating the second restricting member 51. As illustrated in FIG. 6A, the second restricting member 51 is mounted to the housing 14 at another end 15b of the reading unit 15 opposite to the one end 15a of the reading unit 15 in the main scanning direction MS. FIG. 6B is a perspective view of the second restricting member 51. The second restricting member 51 includes a plate-like portion 50, a grasping portion 54, a projecting portion 53, and protruding portions 52. The grasping portion 54 is provided to one end of the plate-like portion 50. The projecting portion 53 is provided to another end of the plate-like portion 50. The protruding portions 52 extend downward from the projecting portion 53 and protrude toward both sides. As illustrated in FIG. 3, the reading unit 15 has a hole 70 at another end 15b in the main scanning direction MS. Walls 71 parallel to the main scanning direction MS are formed on both sides of the hole 70 in the sub-scanning direction SS.

Figure 6C:
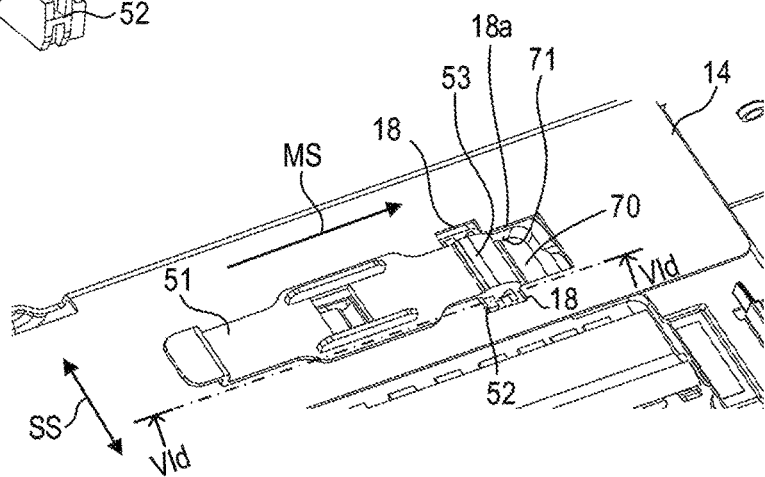
Figure 6D:
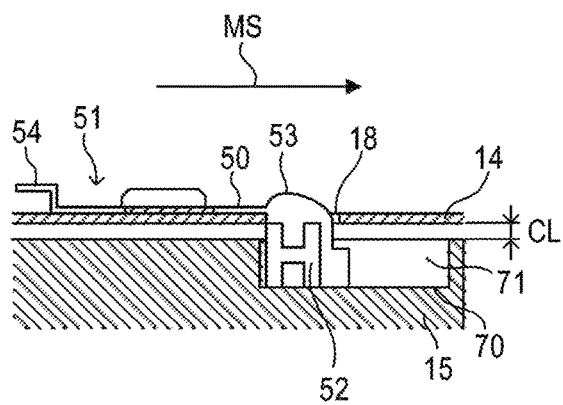
Figure 6E:
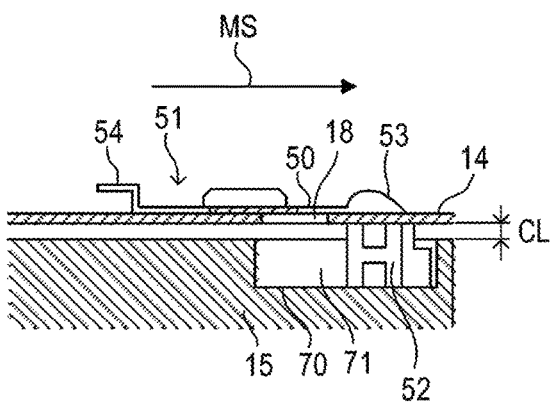

As illustrated in FIG. 6C, the protruding portions 52 of the second restricting member 51 are inserted into the hole 70 formed in the reading unit 15 through a hole 18 formed in the housing 14. FIG. 6D is a sectional view taken along the line VId-VId of FIG. 6C. FIG. 6D is a sectional view of the housing 14 and the reading unit 15, for illustrating the protruding portion 52 inserted into the hole 70 formed in the reading unit 15 through the hole 18 formed in the housing 14. The second restricting member 51 is caused to slide in the main scanning direction MS to be mounted to the housing 14. FIG. 6E is a sectional view of the housing 14 and the reading unit 15, for illustrating the protruding portion 52 is caused to slide in the main scanning direction MS. The protruding portion 52 is sandwiched between the hole 70 of the reading unit 15 and the housing 14, and retains a clearance CL formed between the reading unit 15 and the housing 14. With this, the movement of the reading unit 15 in the vertical direction VD can be restricted also at another end 15b of the reading unit 15 to which the second restricting member 51 is mounted. The second restricting member 51 may be caused to slide in the main scanning direction MS to be inserted into the clearance (gap) CL formed between a lower surface of the housing 14 and an upper surface of the reading unit 15.

Further, the hole 18 of the housing 14 has a hole 18a having a smaller width in the sub-scanning direction SS. The second restricting member 51 includes the projecting portion 53 configured to be engaged to the hole 18a of the housing 14 to determine a position of the second restricting member 51 in the sub-scanning direction SS. The projecting portion 53 of the second restricting member 51 is engaged to the hole 18a to restrict the movement of the second restricting member 51 in the sub-scanning direction SS with respect to the housing 14. The protruding portions 52 provided on both sides of the second restricting member 51 in the sub-scanning direction SS are held in abutment against the walls 71 formed on both sides of the hole 70 in the sub-scanning direction SS of the reading unit 15, respectively. With this, the second restricting member 51 restricts the movement of the reading unit 15 in the sub-scanning direction SS.

According to this embodiment, the movement of the reading unit 15 in the vertical direction VD and the sub-scanning direction SS in the logistics can be restricted. As a result, breakage of the reading unit can be prevented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-074197, filed Apr. 9, 2019, which is hereby incorporated by reference herein in its entirety.

What is claimed is:

1. An image reading apparatus comprising:
a platen on which an original is placed;
a reading unit configured to read an image of the original placed on the platen in a main scanning direction while moving in a sub-scanning direction orthogonal to the main scanning direction;
a housing configured to accommodate the reading unit and support the platen;
a guide shaft extending in the sub-scanning direction and fixed to the housing, the guide shaft being configured to guide a movement of the reading unit in the sub-scanning direction;
a sliding member provided to the reading unit and configured to slide on the guide shaft; and
a restricting member provided to the reading unit and including protruding portions which are disposed under the guide shaft and which protrude in the main scanning direction,
wherein the protruding portions are disposed in different positions, respectively, in the sub-scanning direction, and
wherein the sliding member and the protruding portions abut against the guide shaft to restrict a movement of the reading unit in a vertical direction orthogonal to the main scanning direction and the sub-scanning direction.

2. The image reading apparatus according to claim 1, wherein the protruding portions have regions overlapping with the guide shaft as viewed along the vertical direction.

3. The image reading apparatus according to claim 1, further comprising a fixing member removably fixable to the housing,
wherein the housing is provided with a first opening,
wherein the restricting member is provided with a second opening, and
wherein the fixing member is engaged with the first opening and the second opening so that the movement of the reading unit in the sub-scanning direction is restricted.

4. The image reading apparatus according to claim 1, wherein the guide shaft is provided to the housing at one end of the reading unit in the main scanning direction, and
wherein the restricting member and the sliding member are arranged at the one end of the reading unit.

5. The image reading apparatus according to claim 1, wherein a width of the restricting member in the sub-scanning direction is equal to a width of the reading unit in the sub-scanning direction.

6. The image reading apparatus according to claim 1,
wherein the restricting member is arranged on a side opposite to the sliding member with respect to the guide shaft.

7. The image reading apparatus according to claim 1, wherein the restricting member is formed with a material different from a material of the reading unit.

8. The image reading apparatus according to claim 1, further comprising a second restricting member mounted to the housing at another end of the restricting member in the main scanning direction.

9. The image reading apparatus according to claim 8, wherein the second restricting member is caused to slide in the main scanning direction to be inserted into a gap between a lower surface of the housing and an upper surface of the reading unit.

10. The image reading apparatus according to claim 8, wherein the second restricting member includes a projecting portion configured to be engaged with a hole provided in the housing to determine a position of the second restricting member in the main scanning direction.

11. The image reading apparatus according to claim 1, wherein the sliding member is disposed between the protruding portions in the sub-scanning direction.

* * * * *